United S [15] 3,701,498
Ferrara [45] Oct. 31, 1972

[54] FIBEROPTIC CLEARANCE LIGHT SYSTEM

[72] Inventor: Peter B. Ferrara, Bel Air, Md.

[73] Assignee: The United States of America as represented by the Secretary of the Army

[22] Filed: June 3, 1971

[21] Appl. No.: 149,420

[52] U.S. Cl.....................244/17.11, 350/96 B, 416/5
[51] Int. Cl................................................B64c 27/00
[58] Field of Search........416/5, 61, 146; 178/DIG. 2; 350/96 B; 244/17.11

[56] References Cited

UNITED STATES PATENTS

| | | |
|---|---|---|
| 3,174,552 | 3/1965 | Soucy, Jr...................416/5 X |
| 3,395,875 | 8/1968 | Donovan...................416/5 X |
| 3,480,786 | 11/1969 | Kottman..................350/96 B |

*Primary Examiner*—Milton Buchler
*Assistant Examiner*—Paul E. Sauberer
*Attorney*—Harry M. Saragovitz, Edward J. Kelly and Herbert Berl

[57] ABSTRACT

Problems with individual lamps on helicopter blades are minimized by use of a single source of white light and fiberoptic cables to pipe the light together with colored lenses (e.g. red for port and green for starboard).

6 Claims, 3 Drawing Figures

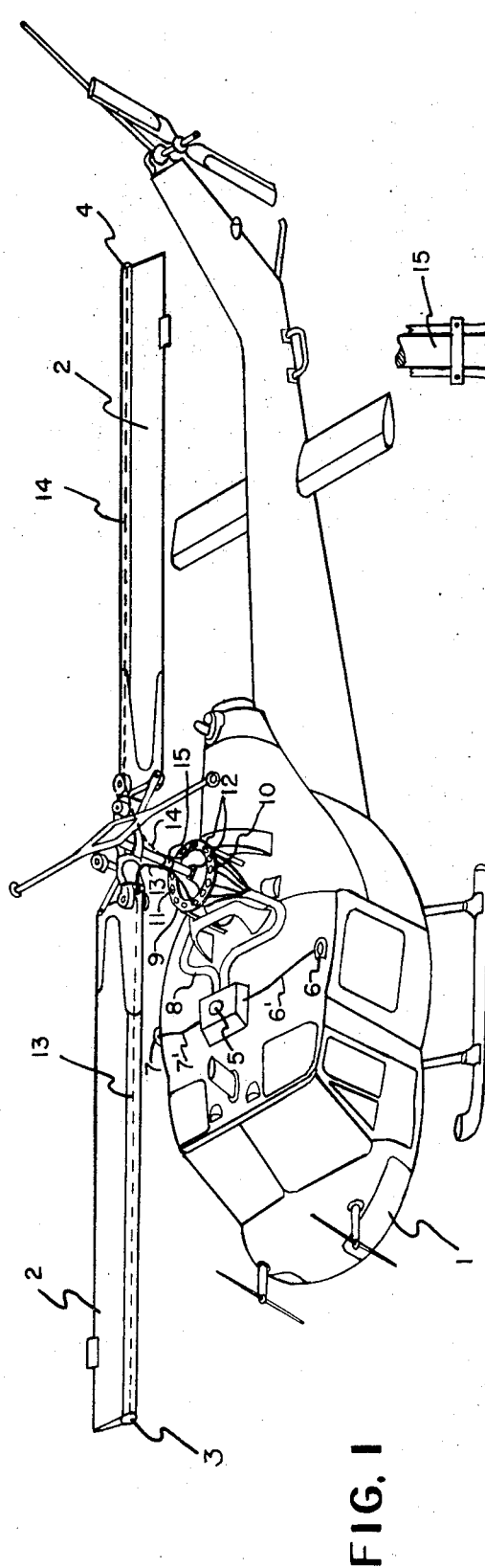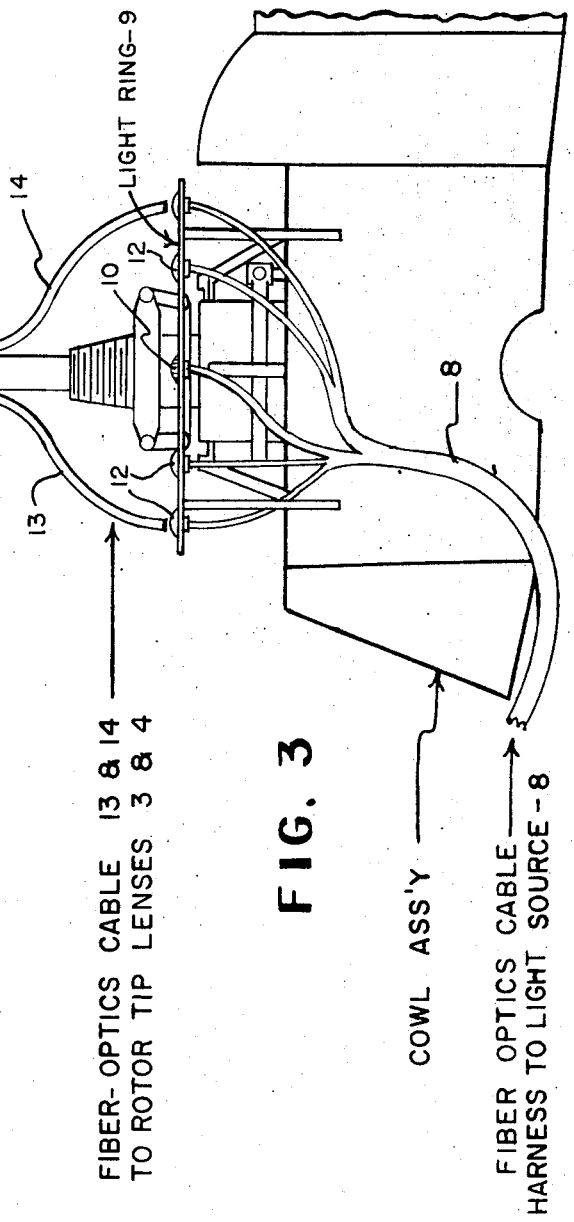

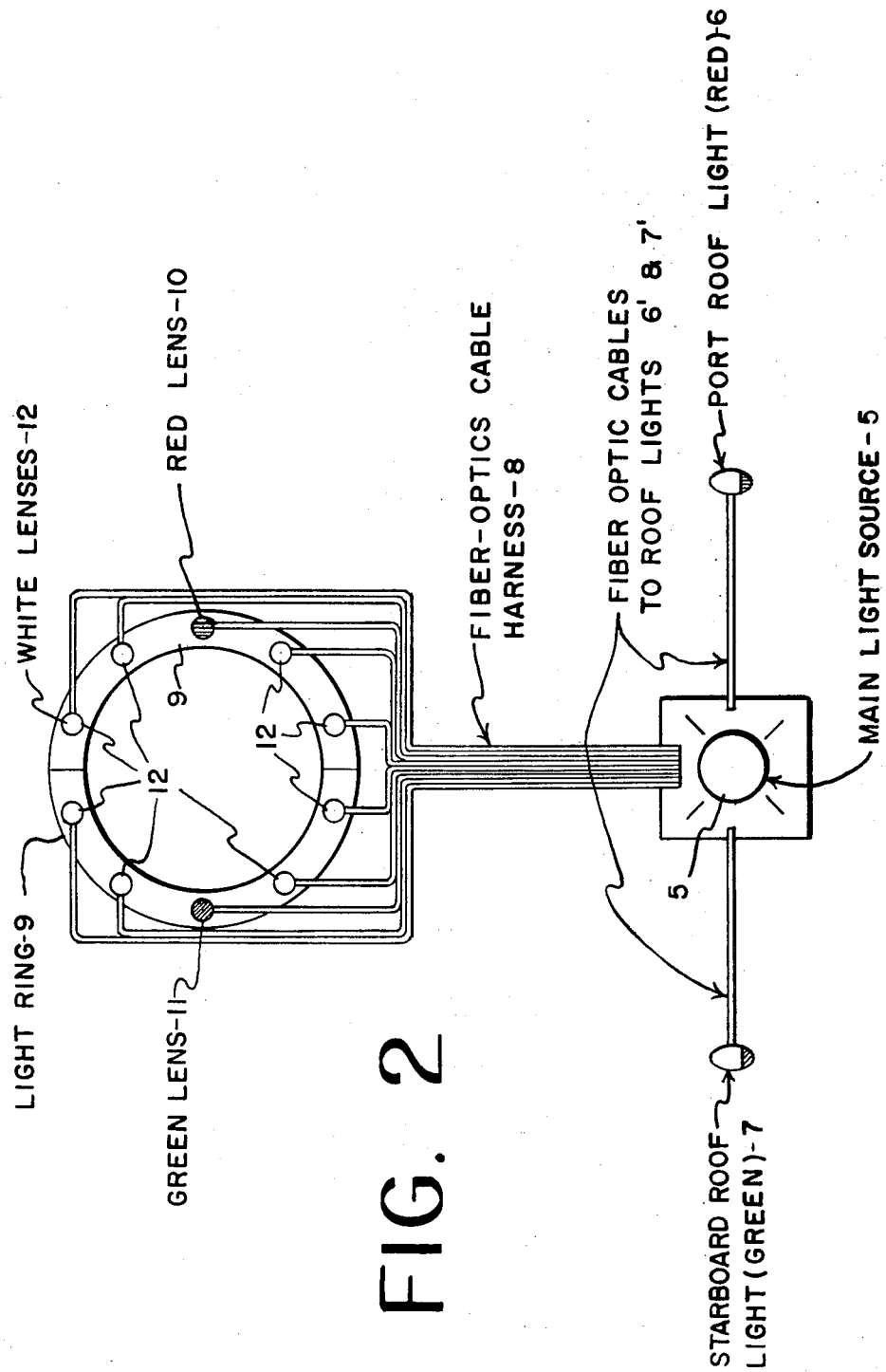

FIBEROPTIC CLEARANCE LIGHT SYSTEM

The invention described herein may be manufactured, used, and licensed by or for the Government for governmental purposes without the payment to me of any royalty thereon.

Brief Summary:

For well-known rotor tip illumination special lamp bulbs are placed at the tips. These bulbs are special and expensive because their white hot filaments must withstand tremendous centrifugal forces. (In the UH-1 series helicopters, g forces exceed 1,000.) Further, servicing of these bulbs, wiring or fixtures requires platform equipment for the service men. Still further, the special commutators and brushes used near the hub of the blade to feed current out to the red or the green lamp fixtures has been a source of much trouble under the widely varying climatic conditions from arctic cold to desert heat to jungle steam.

The present invention overcomes drawbacks set out hereinabove and minimizes other problems as will be evident to those skilled in the art.

In the Drawing:

FIG. 1 is a perspective of the invention as applied to a helicopter;

FIG. 2 is a schematic representation of the lighting system;

FIG. 3 is a schematic representation of the rotary light ring connector.

In FIG. 1 the outline of a helicopter is illustrated at 1. Rotor 2 has rotary wing tip lenses 3 and 4 mounted thereon. A single source of light 5 may be mounted on top of the cabin. If desired light source 5 could have, as a part thereof, a rotary beacon of the anti-collision type. Light source 5 also supplies light to port lens 6 and starboard lens 7, as well as rotary tip lenses 3 and 4, via fiberoptics cables 6, 7 and 8. Lenses 3, 4, 6 and 7 may be of the Fresnel type to provide outlet light distributed over a larger area than the cable ends. Cables 8 conduct light to light ring 9 (FIG. 2) having (at least) a red lens 10, a green lens 11 and preferably having a series of white lenses 12.

In FIG. 3 light transmitting cables 13 and 14 pickup light from lenses 10, 11 and 12 and transmit the light to rotary wing tip lenses 3 and 4.

Operation:

Light from source 5 is piped to lenses 6 and 7 which spread it to any desired pattern so that red from lens 6 may be seen only from the port side and green from lens 7 may be seen only from the starboard side. Light from source 5 also is piped through harness 8 to light ring 9 to emerge through lenses 10, 11 and 12. Cable 13 pipes light to lens 3, and cable 14 pipes light to lens 4, as the lenses whirl in a circle about rotor shaft 15. In FIG. 2 eight white lenses are illustrated. Therefore cables 13 and 14 and lenses 3 and 4 are energized with white light eight times per revolution, thereby producing substantially a circle of white light indicating the rotor wing tips. However, when cables 13 and 14 pass red lens 10 they are energized with red light and they pipe red light to lenses 3 and 4. This occurs at a localized area of the rotary wing tip on the port side, thereby producing a red light on the port side of the circle of white light and on the port side of the helicopter. Similarly, when cables 13 and 14 pass the green lens they energize lenses 3 and 4 with green light on the starboard side.

Eight circular white lenses and two colored lenses are illustrated. However, the number could be varied for greater or lesser transmission. Further, the size and shape of the lenses could be varied for similar purposes. By use of a large number of fiberoptic cables and lenses the light transmitted from light ring 9 to cables 13 and 14 could be almost continuous and uninterrupted. Or, by use of a few cables and lenses the light could be transmitted only intermittently in a blinking effect. Or, modified Fresnel lenses could be used to vary the overall transmission properties in a manner that would be obvious to those skilled in the art. Well-known elliptical or rectangular modifications of the Fresnel lens could be used to obtain pretty-much uniform full-time lighting of lenses 3 and 4. Or, a blinking on-off effect can be obtained by use of a few small lenses. Amber lenses could be inserted for use where caution is required, or other colors could be used for other purposes.

I claim:

1. In a lighting system in combination with a rotary wing aircraft a source of light, a stationary light ring, first means to conduct light from said source to various locations on said light ring to shine outwardly therefrom, second light conducting means in fixed relationship to at least one of the rotary wings to rotate therewith and pickup light shining outwardly from said ring, said second light conducting means extending from a location adjacent to the hub of the rotary wing outwardly along the length thereof.

2. A system according to claim 1 wherein the said second light conducting means extends along all of the rotary wings to points adjacent to the ends of the tips thereof to shine outwardly from the revolving tips.

3. The combination of claim 2 wherein lenses of various colors are operatively associated with said first means to conduct light and causing the light shining outwardly from said light ring and along the rotary wing to be similarly vari-colored.

4. Apparatus as in claim 2 and lenses operatively associated with said second light conducting means and adjacent to the rotary wing tips to spread the light shining outwardly therefrom.

5. Apparatus as in claim 1 and third light conducting means to conduct light to a fixed lens on the right side of the aircraft and fourth light conducting means to conduct light to a fixed lens on the left side of the aircraft.

6. Apparatus as in claim 3 wherein said lenses of various colors include a green lens affecting light to the rotary wing tips when on the starboard side, a red lens affecting light to the rotary wing tips when on the port side, and a clear or white lens affecting light to the rotary wing tips in between.

* * * * *